(12) United States Patent
Sato et al.

(10) Patent No.: US 6,664,877 B2
(45) Date of Patent: Dec. 16, 2003

(54) SOLENOID FOR ELECTROMAGNETIC VALVE

(75) Inventors: Hideharu Sato, Tsukuba-gun (JP); Yoshio Aso, Tsukuba-gun (JP); Shinichi Yoshimura, Tsukuba-gun (JP); Takumi Matsumoto, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/200,176

(22) Filed: Jul. 23, 2002

(65) Prior Publication Data

US 2003/0030525 A1 Feb. 13, 2003

(30) Foreign Application Priority Data

Aug. 13, 2001 (JP) ........................................ 2001-245727

(51) Int. Cl.⁷ .............................. F16K 31/06; H01F 7/08
(52) U.S. Cl. ........................ 335/255; 335/261; 335/278; 335/279; 251/129.15
(58) Field of Search ................................. 335/255, 257, 335/258, 261, 262, 263, 270, 274, 277, 278; 251/129.01–129.22

(56) References Cited

U.S. PATENT DOCUMENTS 4,783,049 A * 11/1988 Northman et al. ...... 251/129.14
4,896,861 A *  1/1990 Kojima .................. 251/129.15

* cited by examiner

Primary Examiner—Ramon M. Barrera
(74) Attorney, Agent, or Firm—Oblon, Spivak, McClelland, Maier & Neustadt, P.C.

(57) ABSTRACT

A magnetic body case in a solenoid for an electromagnetic valve has a cylindrical skirt portion which surrounds a side face of a bobbin and a cap portion which covers one end face of the bobbin in an axial direction thereof, these skirt portion and cap portion are respectively formed individually, and the magnetic body case is assembled by coupling the cap portion to one end of the skirt portion in the axial direction.

7 Claims, 5 Drawing Sheets

SOLENOID FOR ELECTROMAGNETIC VALVE

TECHNICAL FIELD

The present invention relates to a solenoid for an electromagnetic valve which is mounted to an electromagnetic valve to drive a valve member for switching flow paths.

PRIOR ART

As shown in FIG. 7, an electromagnetic valve 50 which has been previously proposed by the present applicant comprises a valve portion 51 provided inside with an unillustrated valve member for switching flow paths and a solenoid portion 52 which is connected to the valve portion 51 to drive the valve member, and the valve member of the valve portion 51 is constituted so as to be opened/closed according to pushing effected by a push rod 60.

The solenoid portion 52 is constituted by assembling, in a cylindrical magnetic body case 53 provided at one end with an opening connected with the valve portion 51, a bobbin 55 having a coil 54 wound around an outer periphery thereof, a magnetic body plate 59 which has been attached to an end side of the opening of the magnetic body case 53, a fixed iron core 56 and a movable iron core 58 which have been inserted into central holes of the magnetic body plate 59 and the bobbin 55, and a return spring 57 which biases the movable iron core 58 in a direction in which the movable iron core 58 is separated from the fixed iron core 56 to push the push rod 59.

Then, when the coil 54 of the solenoid portion 52 is energized, as shown on a right half in FIG. 7, the movable iron core 58 is attracted to the fixed iron core 56 to be retracted so that pressing on the push rod 59 is released. When the coil 54 is de-energized, as shown on a left half in FIG. 4, the movable iron core 58 is separated from the fixed iron core 56 by biasing force of the return spring 57 to press the push rod 59, so that the valve member is driven in an interlocking manner therewith.

Now, the magnetic body case 53 generally has a cylindrical skirt portion 53a surrounding a side face of the bobbin 55 and a cap portion 53b covering one end of the skirt portion 53a, where these portions are formed in an integral manner. That is, it is common to punch a member having a shape where these skirt portion 53a and cap portion 53b have been developed integrally in a continuous manner out of a base plate to bend and fold the member in a predetermined shape. However, since the shape of the member where the skirt portion 53a and the cap portion 53b have been developed integrally in a continuous manner is complicated, waste of the material increases when the member is punched out. Also, even when the member is folded and assembled after punched out, since the member must be folded in plural directions and opposed ends must be joined to each other, the number of working steps increases, which results in increase in cost.

On the other hand, in case that the magnetic body case is cylindrical, it is possible to form the magnetic body case by performing a deep drawing of a magnetic base plate. In case that such a working is performed, such a problem occurring at the punching work can be avoided. However, in a case of a non-cylindrical magnetic body case, it is difficult to perform the deep drawing work. For example, when the sectional shape of the movable iron core or the fixed iron core is formed in an elliptic shape including an oval for the purpose of improving the performance of a solenoid or the like, the sectional shape of the bobbin on which the coil has been wound becomes elliptic, so that the magnetic body case must be formed in such a sectional shape as a rectangle so as to correspond to the elliptic shape. However, it is difficult to form a magnetic body case with such a shape by the deep drawing work.

DISCLOSURE OF THE INVENTION

An object of the present invention is to form a magnetic body case in a solenoid for an electromagnetic valve easily at a low cost without any waste of material and with a reduced number of working steps even in case that the sectional shape of the magnetic body case is circular and even in case that it is non-circular such as rectangular.

In order to solve the above problem, according to the present invention, there is provided a solenoid which is mounted to an electromagnetic valve to drive a valve member for switching flow paths. This solenoid comprises: a bobbin which has an iron core hole extending in an axial direction thereof at a center and which has a coil wound around an outer periphery thereof; a magnetic body case which is provided with a cylindrical skirt portion which surrounds a side face of the bobbin and a cap portion covering one end face of the bobbin in the axial direction; an annular magnetic body plate which is connected to an inside of the magnetic body case on the side of the other end face of the bobbin; a movable iron core which is movably received in an iron core hole positioned at centers of the bobbin and the magnetic body plate; a fixed magnetic pole member which attracts the movable iron core; and a return spring which biases the movable iron core in a direction of separating from the fixed magnetic pole member, wherein the skirt portion and the cap portion in the magnetic body case are formed individually of each other, and the magnetic body case is assembled by coupling the cap portion into one end of the skirt portion in the axial direction.

According to the present invention having such a constitution, since the magnetic body case is assembled by forming the skirt portion and the cap portion of the magnetic body case individually and coupling the cap portion to one end of the skirt portion, even when the magnetic body case has any sectional shape, it can be formed easily at a low cost without waste of material and with a reduced number of working steps as compared with a conventional method.

In the present invention, preferably, the thickness of the cap portion in the magnetic body case is larger than that of the skirt portion.

Also, according to the present invention, the cap portion of the magnetic body case has a fitting portion whose shape and size are equal to an inner side shape and inner side size of the skirt portion, and the skirt portion and the cap portion are mutually coupled to each other by fitting this fitting portion to the end portion of the skirt portion.

Furthermore, in the present invention, the sectional shapes of the iron core hole and the movable iron core can be made elliptic and the outer shape of the magnetic body case may be made rectangular.

According to one embodiment of the present invention, the cap portion of the magnetic body case and the fixed magnetic pole member are formed as members separated from each other, they are joined integrally by welding, and the fixed magnetic pole member is fitted into the iron core hole.

According to another embodiment of the present invention, the cap portion of the magnetic body case and the fixed magnetic pole member are formed integrally from the same material, and the fixed magnetic pole member is fitted into the iron core hole.

According to still another embodiment of the present invention, the cap portion of the magnetic pole case also serves as the fixed magnetic pole member, and it has a magnetic pole face for attracting the movable iron core at its portion covering the iron core hole.

DETAILED DESCRIPTION

Figure 1:
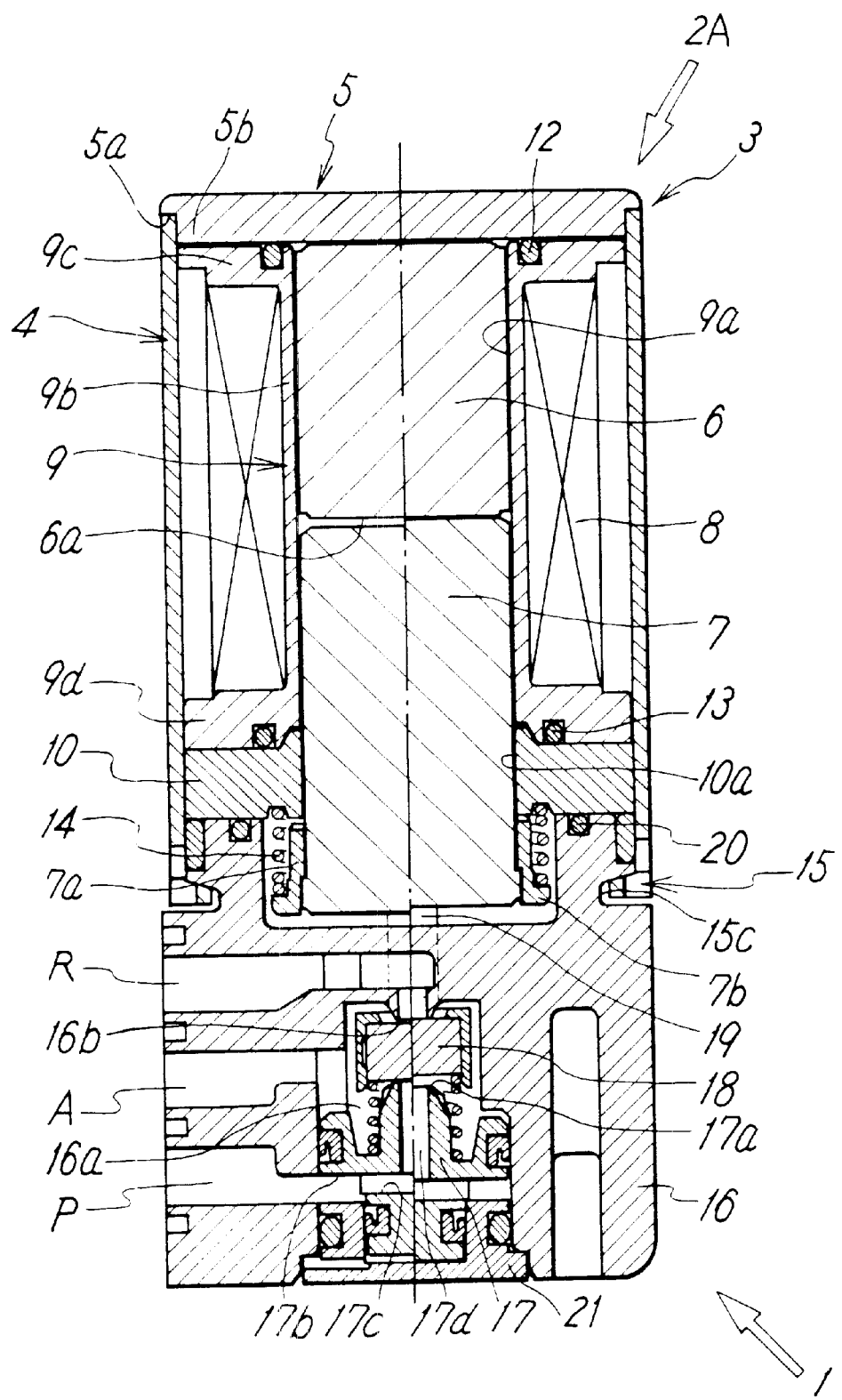
FIG. 1 shows a first embodiment of a solenoid for an electromagnetic valve according to the present invention and is a longitudinal sectional view of a state where the solenoid has been mounted to an electromagnetic valve, a left half thereof showing an de-energized state to the solenoid and a right half thereof showing an energized state to the solenoid.

FIG. 1 shows a first embodiment of a solenoid for an electromagnetic valve according to the present invention and illustrates a case that the solenoid has been applied to a 3-port type electromagnetic valve. This electromagnetic valve has a valve portion 1 in which a valve member 18 for switching flow paths is housed and a solenoid 2A which drives the valve member 18.

The solenoid 2A is provided with a magnetic body case 3. The magnetic body case 3 is formed with a cylindrical skirt portion 4 having a rectangular sectional shape and a rectangular cap portion 5 which closes one end of the skirt portion 4 in an axial direction.

Figure 2:
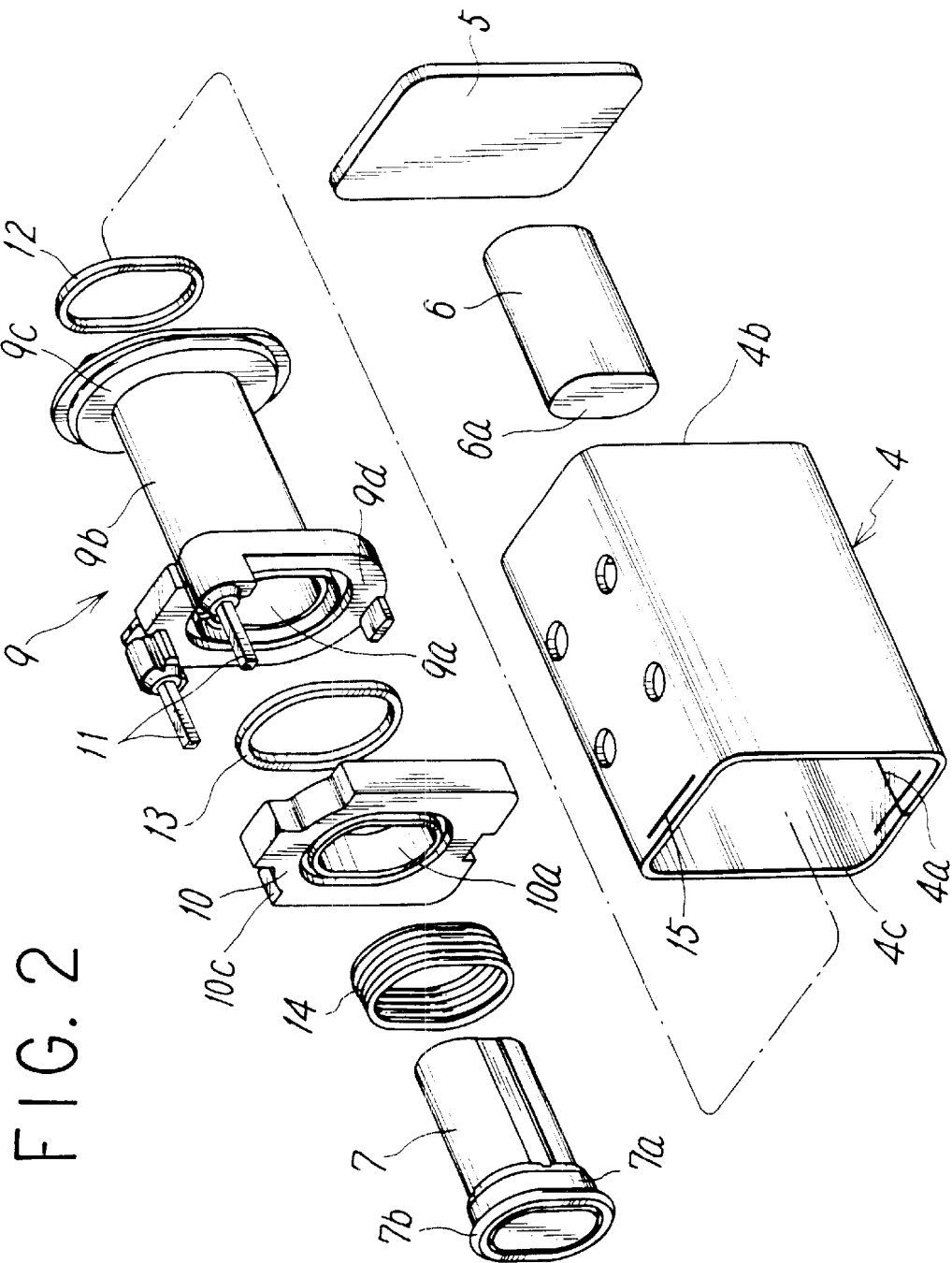
FIG. 2 is a dissolved perspective view of the solenoid in FIG. 1.

As understood from FIG. 2, the skirt portion 4 is formed by folding a rectangular magnetic plate in a rectangular cylindrical shape, causing both end portions thereof to abut on each other at a position of a joining portion 4a which is positioned at an intermediate portion of one side face and fixing them by means of welding or the like, and it has a first end 4b and a second end 4c which are opened at both end portions in an axial direction thereof.

Also, the cap portion 5 is formed so as to have the same sectional shape and size as those of the skirt portion 4 utilizing as a material a magnetic plate having a thickness thicker than the of the magnetic plate constituting the skirt portion 4. A stepped portion 5a having a height which is generally equal to the thickness of the skirt portion 4 is formed at an outer periphery of the cap portion 5, and a portion surrounded by this stepped portion 5a serves as a fitting portion 5b having the same shape and size as an inner side shape and an inner side size of the skirt portion 4. Then, the magnetic body case 3 is assembled by fitting and fixing the fitting portion 5 into the first end 4b of the skirt portion 4. Fixation of the skirt portion 4 and the cap portion 5 can be performed by pressure-fitting the fitting portion 5b in the skirt portion 4 closely to utilize a fitting force therebetween or by utilizing fixing means such as welding, soldering or the like.

In this manner, the skirt portion 4 and the cap portion 5 of the magnetic body case 3 are respectively formed individually, and the magnetic body case 3 is assembled by coupling the cap portion 5 to one end of the skirt portion 4, so that, even when the magnetic body case has any sectional shape, it can be formed easily at low cost without waste of material and with a reduced number of working steps, as compared with a conventional method where the magnetic body case is assembled by punching a plate in a developed shape thereof.

A bobbin 9 made of non-magnetic body, which has an elliptic iron core hole 9a at a center and whose outer periphery has been wound with a coil 8, and a magnetic body plate 10 which has been coupled and fixed to an inner face of the magnetic body case 3 in a state where it has abutted on an end face of the bobbin 9 are provided inside the magnetic body case 3. This magnetic body plate 10 also has an elliptic iron core 10a, the iron core hole 9a of the bobbin 9 and the iron core hole 10a of the magnetic body plate 10 are contiguous to each other coaxially, and a fixed iron core 6 and a movable iron core 7 which have elliptic sectional shapes are received in these iron core holes 9a and 10a.

The bobbin 9 has a cylindrical portion 9b on which the coil 8 has been wound, and flange portions 9c and 9d provided integrally on both ends of the cylindrical portion 9b in an axial direction, and seal members 12 and 13 are provided on the flange portions 9c and 9d so as to surround the iron core hole 9a. As understood from FIG. 2 and FIG. 3, power supply terminals 11 for energizing the coil 8 extend from the flange portion 9d positioned on the valve portion 1 side so as to pass through notches 10c of the magnetic body plate 10 towards the valve portion 1 side.

Then, the bobbin 9 is inserted into the magnetic body case 3, the flange portion 9c abuts on an inner face of the cap portion 5 via the seal member 12 and the fixed iron core 6 is fitted into the iron core hole 9a up to its intermediate portion. Also, the magnetic body plate 10 is arranged to the other flange portion 9d of the bobbin 9 via a seal member 13 disposed around the iron core hole 9a, and an outer peripheral end of the magnetic body plate 10 is fixed to an inner peripheral face of the skirt portion 4 by such means as welding or the like.

The fixed iron core 6 is formed in a column shape having an elliptic section, its proximal end portion is fixed to an inner face of the cap portion 5b such means as welding or the like, and its distal end face serves as a magnetic pole face 6a for attracting the movable iron core 7. Also, the movable iron core 7 is a member with a column shape having an elliptic section like the fixed iron core 6, its proximal end face is inserted into the iron core holes 9a and 10a so as to be opposed to the magnetic pole face 6a of the fixed iron core 6, a ring 7a made from synthetic resin, which also serves as a stopper and a spring seat, is fitted on a distal end portion extending from the iron core hole, and a return spring 14 is interposed between a flange-shaped spring receiving portion 7b of the ring 7a and the magnetic body plate 10 in a compressed manner.

Thus, a magnetic path surrounding the coil 8 is formed by the skirt portion 4 and the cap portion 5 in the magnetic body case 3, the magnetic body plate 10 fixed to the skirt portion 4, and the movable iron core 7 and the fixed iron core 6.

Figure 3:
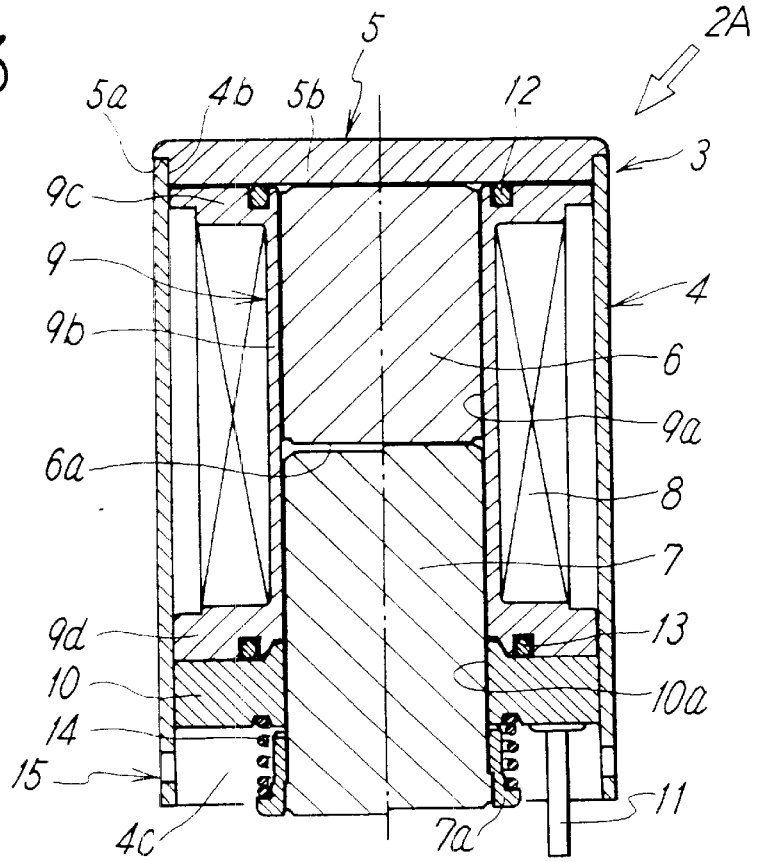
FIG. 3 is a longitudinal sectional view showing the solenoid of FIG. 1 exploded at a different position, a left half thereof showing a de-energized state to the solenoid and a right half thereof showing an energized state to the solenoid.

In the solenoid 2A having such a structure, when the coil 8 is put in a de-energized state, the attracting force from the fixed iron core 6 does not act on the movable iron core 7, so that the movable iron core 7 occupies a position where it has been separated from the fixed iron core 6 such as shown on left halves in FIGS. 1 and 3 due to the biasing force of the return spring 14 and it abuts on the push rod 19 of the valve portion 1 to push it. Also, when the coil 8 is energized from the terminals 11, as shown on right halves in FIGS. 1 and 3, the fixed iron core 6 attracts the movable iron core 7 against the biasing force of the return spring 14 and the movable iron core 7 releases pushing on the push rod 19. Thus, the valve member 18 is driven by the movable iron core 7 via the push rod 19.

Next, the valve portion 1 will be explained in detail with reference to FIG. 1. The valve portion 1 has a valve body 16, and the valve body 16 has an input port P, an output port A and a discharge port R as well as a valve chamber 16a communicating with each port. One end of the valve chamber 16a is closed by an end block 21, a movable orifice member 17 which is movably supported by the end block 21 and the valve member 18 of a poppet type are disposed in the valve chamber 16a, and a distal end of the push rod 19 abuts on the valve member 18.

The orifice member 17 is provided with a supply valve seat 17a which is opened in the valve chamber 16a, a flow path 17d which causes the supply valve seat 17a and the input port P to communicate with each other, and a first pressure receiving face 17b and a second pressure receiving face 17c on which fluid pressure from the input port P acts in a direction of the valve member 18 and in a direction opposed thereto. Then, the orifice member 17 is received in the valve chamber 16a slidably in an axial direction thereof, namely, in a direction in which the supply valve seat 17a and the valve member 18 approach to/separate from each other. Incidentally, the first pressure receiving face 17b has a larger pressure receiving area than that of the second pressure receiving face 17c on which the fluid pressure acts in the opposed direction, so that the orifice member 17 can be moved between a position of approaching to the valve member 18 and a position of separating therefrom by the fluid pressure acting force acting on the first pressure receiving face 17b.

Also, the valve member 18 is movably disposed between a discharge valve seat 16b which causes the discharge port R and the valve member 16a to communicate with each other and the supply valve seat 17a, and it is for opening/closing both the valve seats 17a and 16b according to operation of the solenoid 2A.

Then, the valve portion 1 and the solenoid 2A are coupled to each other closely via a seal member 20 by caulking a caulking portion 15 provided on the periphery of the second end 4c of the skirt portion 4 into a groove portion 15c recessed in the valve body 16 of the valve portion 1.

In the electromagnetic valve having such a structure, in case that the solenoid 2A is put in a de-energized state, as shown on the left half in FIG. 1, the movable iron core 7 pushes the valve member 18 on to the supply valve seat 17a of the orifice member 17 via the push rod 19 to close the supply valve seat 17a and simultaneously open the discharge valve seat 16b to the maximum extent. For this reason, the output port A communicates with the discharge portion R via the valve chamber 16a and the discharge valve seat 16b, and the output port and the valve chamber 16a become the atmospheric pressure. On the other hand, since the fluid pressure supplied from the input port A acts on the both pressure receiving faces 17b and 17c of the flow path 17d, the orifice member 17 along with the valve member 18 moves towards the discharge valve seat 16b side up to a position shown on the left half in FIG. 1 due to a fluid pressure acting force difference based on the pressure receiving area difference between the pressure receiving areas 17b and 17c. At this time, the push rod 19 and the movable iron core 7 are slightly pushed back to the position shown in the Figure via the valve member 18. According to this operation, the stroke occurring when the movable iron core 7 is attracted to the fixed iron core 6 is reduced so that switching operation at an energizing time is made fast.

When the solenoid 2A is energized from this state, as shown on the right half in FIG. 1, the pressing on the valve member 18 effected by the movable iron core 7 is released, the valve member 18 opens the supply valve seat 17a and closes the discharge valve seat 16b. Thereby, communication between the discharge port R and the valve chamber 16a is disconnected and the output port A communicates with the input port P via the valve chamber 16a, and simultaneously the pressure of the valve chamber 16a increases, so that the orifice member 17a is pushed back in a direction of separating from the valve member 18 and the supply valve seat 17a opens more widely.

Figure 5:
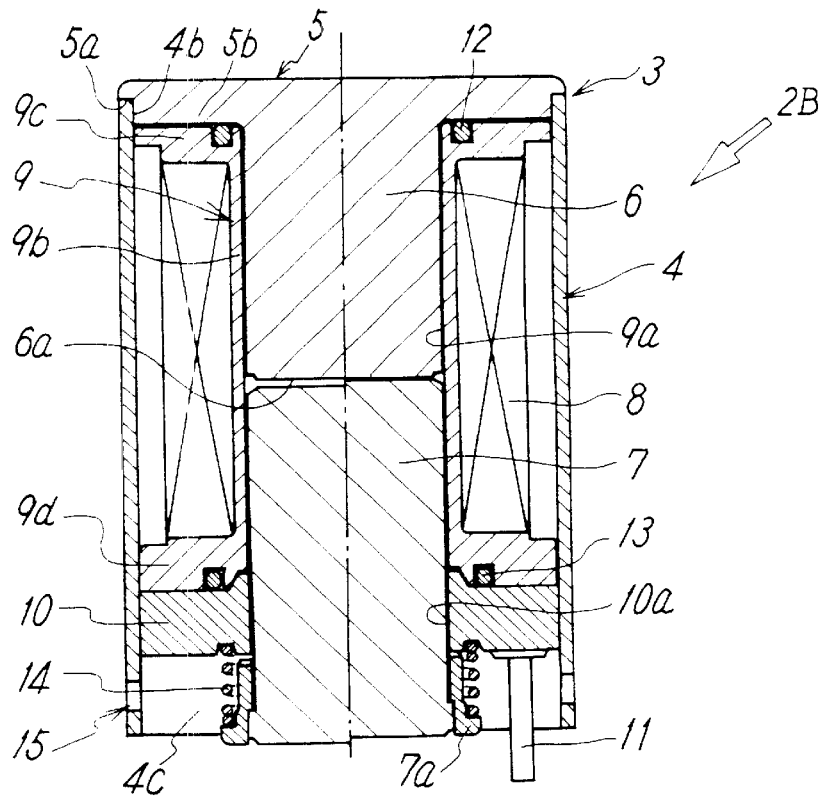
FIG. 5 shows a second embodiment of a solenoid for an electromagnetic valve according to the present invention, a left half thereof showing a de-energized state to the solenoid and a right half thereof showing an energized state to the solenoid.

FIG. 5 shows a second embodiment of a solenoid according to the present invention, and a different point of a solenoid 2B of the second embodiment from the solenoid 2A of the first embodiment is a point that the fixed iron core 6 is formed as a separate member from the cap portion 5 and they are fixed to each other by such means as welding or the like in the first embodiment, while the cap portion 5 and the fixed iron core 6 are integrally formed from the same material in the second embodiment. By employing such a constitution, it is made possible to reduce the number of parts and it is made easier to assemble the solenoid 2A.

Since the other portions of the second embodiment have substantially the same constituents as the first embodiment, the same main constitution portions are denoted by the same reference numerals as those in the first embodiment and explanation thereof will be omitted.

Figure 6:
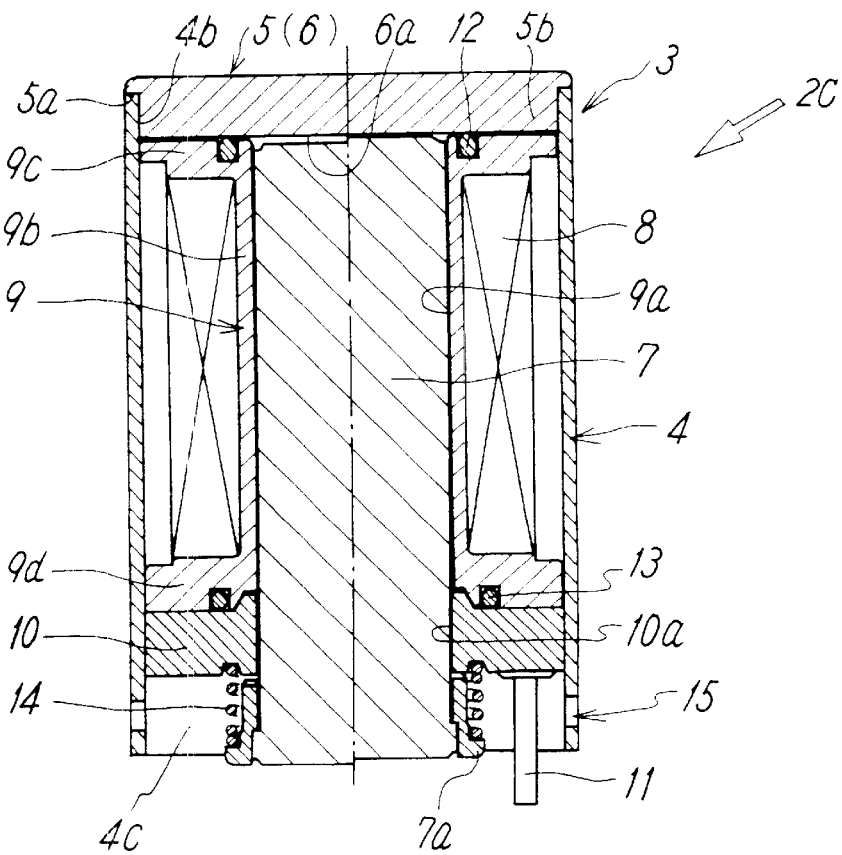
FIG. 6 shows a third embodiment of a solenoid for an electromagnetic valve according to the present invention, a left half thereof showing an de-energized state to the solenoid and a right half thereof showing an energized state to the solenoid.
Figure 7:
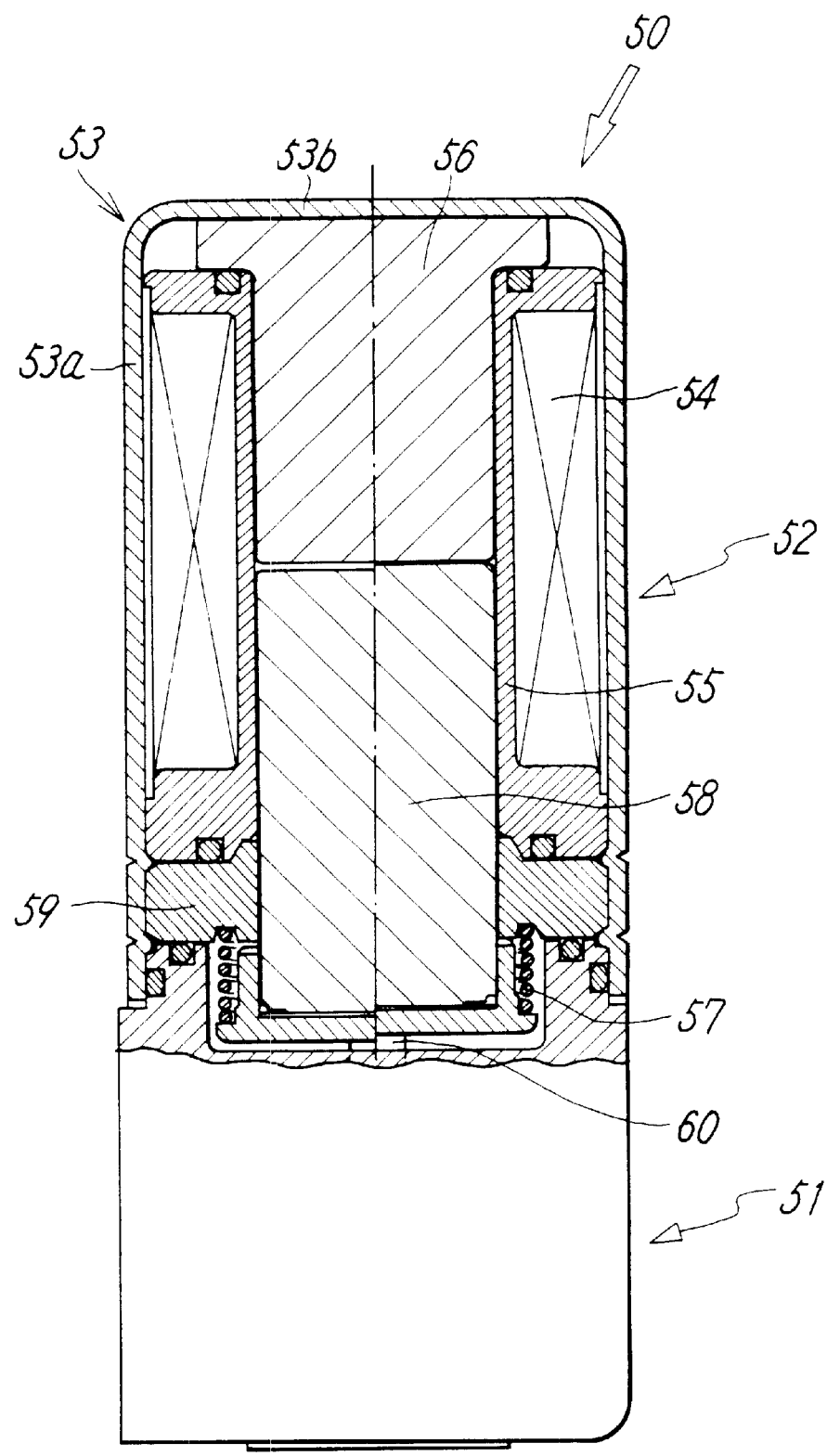
FIG. 7 is a partially longitudinal sectional view of a conventional electromagnetic valve, a left half thereof showing a de-energized state to the solenoid and a right half thereof showing an energized state to the solenoid.

FIG. 6 shows a third embodiment of a solenoid of the present invention, and a different point of a solenoid 2C of the third embodiment from the solenoids 2A and 2B of the first and second embodiments is a point that the column-shaped fixed iron core 6 fitted into the iron core hole 9a of the bobbin 9 is provided in the first and second embodiments, while the cap portion 5 also serves as the fixed iron core and the column-shaped fixed iron core fitted into the iron core hole 9a is not provided in the third embodiment. That is, the cap portion 5 is entirely formed in a flat plate shape, and it has a flat inner face and has a magnetic pole face 6a for movable iron core attraction at a portion of the inner face covering the iron core hole 9a. Then, the movable iron core 7 is fitted in to the entire inside of the iron core holes 9a and 10a and is constituted such that it approaches to/separates from the magnetic pole face 6a of the cap portion 5 according to an energizing operation to the coil 8.

By employing such a constitution, the number of parts can be not only reduced but also assembling of the solenoid 2A can further be facilitated because it becomes unnecessary to insert the column-shaped fixed iron core 6 into the iron core hole 9a of the bobbin 9 in a state where their central axial lines are caused to be exactly coincident with each other like the first and second embodiments.

Regarding the other portions of the third embodiment, since the third embodiment has substantially the same constitution as that of the first embodiment, the same main constitution portions are denoted by the same reference numerals as those in the first embodiment and explanation thereof will be omitted.

Figure 4:
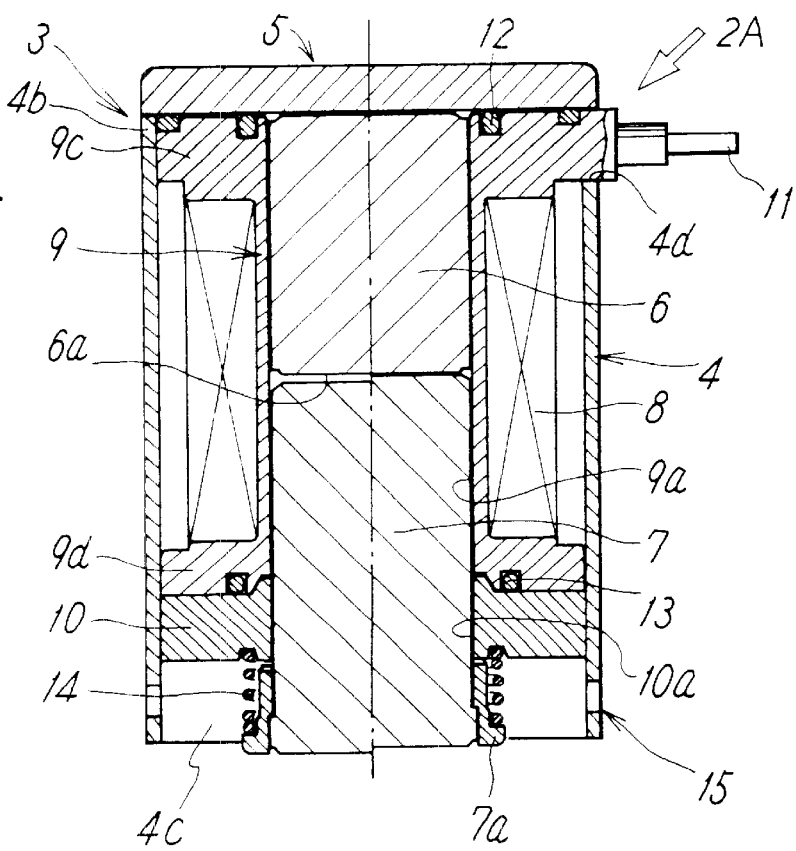
FIG. 4 is a modified embodiment showing a state where the position of a terminal in the solenoid of FIG. 3 has been changed.

Now, in each of the above embodiments, such a constitution has been employed that the terminals 11 for energizing the coil 8 pass through the magnetic body plate 10 from the flange portion 9d of the valve portion 1 side in the bobbin 9 extend to the second end 4c side of the skirt portion 4 and they are inserted into an unillustrated insertion hole of the valve body 16, thereby allowing electrical connection to the terminals 11 externally. However, instead of this constitution, such a constitution as shown in FIG. 4 can be employed. That is, the terminals 11 pass through a terminal hole 4d formed between the skirt portion 4 and the cap portion 5 from the flange portion 9c on the cap portion 5 side in the bobbin 9 to be projected in a side face direction perpendicular to the central axial line of the bobbin 9.

At this time, mounting of the cap portion 5 to the skirt portion 4 can be performed by directly butting an inner end face of the cap portion 5 to the first end 4b of the skirt portion 4 to fix the both without employing the approach of fitting the fitting portion 5b of the cap portion 5 on to the first end 4b of the skirt portion 4 like the above embodiments, so that working of the terminal hole 4d can be achieved by only providing a notch at an end portion of the opening portion 4b.

Incidentally, in each of the above embodiments, the skirt portion 4 of the magnetic body case 3 has been formed by folding a rectangular magnetic plate obtained by punching-out, cutting or the like in a rectangular cylindrical shape, but the skirt portion may be formed by cutting a longitudinal material formed in a rectangular cylindrical shape in advance.

Also, the sectional shape of the magnetic body case 3 is not limited to the rectangle, but it may be formed in various shapes such as a circle, ellipse or the like, which correspond to the shape of the bobbin 9. Furthermore, regarding the sectional shapes of the iron core hole of the bobbin 9 and the movable iron core and the fixed iron core, they are not limited to the ellipse but they may be circular.

What is claimed is:

1. A solenoid for an electromagnetic valve which is mounted to an electromagnetic valve to drive a valve member for switching flow paths, the solenoid comprising:

a bobbin which has an iron core hole extending in an axial direction thereof at a center and which has a coil wound around an outer periphery thereof;

a magnetic body case which is provided with a cylindrical skirt portion which surrounds a side face of the bobbin and a cap portion covering one end face of the bobbin in the axial direction;

an annular magnetic body plate which is connected to an inside of the magnetic body case on the side of the other end face of the bobbin;

a movable iron core which is movably received in an iron core hole positioned at centers of the bobbin and the magnetic body plate;

a fixed magnetic pole member which attracts the movable iron core; and a return spring which biases the movable iron core in a direction of separating from the fixed magnetic pole member, wherein the skirt portion and the cap portion in the magnetic body case are formed individually of each other, the magnetic body case is assembled by coupling the cap portion into one end of the skirt portion in the axial direction, and the sectional shapes of the iron core hole and the movable iron core are elliptic and the sectional shape of the magnetic body case is rectangular.

2. A solenoid according to claim 1, wherein the thickness of the cap portion in the magnetic body case is larger than that of the skirt portion.

3. A solenoid according to claim 1, wherein the cap portion of the magnetic body case has a fitting portion with the same shape and size as an inner shape and an inner size of the skirt portion, and the skirt portion and the cap portion are coupled to each other by fitting the fitting portion to the end portion of the skirt portion.

4. A solenoid according to claim 1, wherein the cap portion of the magnetic body case and the fixed magnetic pole member are formed as members separated from each other, the cap portion and the fixed magnetic pole member are joined integrally by welding, and the fixed magnetic pole member is fitted into the iron core hole.

5. A solenoid according to claim 1, wherein the cap portion of the magnetic body case and the fixed magnetic pole member are formed from the same material, and the fixed magnetic pole member is fitted into the iron core hole.

6. A solenoid according to claim 1, wherein the cap portion of the magnetic body case also serves as the fixed magnetic pole member and has a magnetic pole face for movable iron core attraction at a portion covering the iron core hole.

7. A solenoid according to claim 1, wherein the cap portion is formed so as to have the same sectional shape and size as those of the skirt portion, and completely covers an end face of the skirt portion.

* * * * *